United States Patent
Gleason et al.

(10) Patent No.: US 7,464,065 B2
(45) Date of Patent: Dec. 9, 2008

(54) OBJECT SPECIFIC LANGUAGE EXTENSION INTERFACE FOR A MULTI-LEVEL DATA STRUCTURE

(75) Inventors: Philip Gleason, Boca Raton, FL (US); Steven M. Hancock, Delray Beach, FL (US); Maria E. Smith, Davie, FL (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 11/284,150

(22) Filed: Nov. 21, 2005

(65) Prior Publication Data

US 2007/0118489 A1    May 24, 2007

(51) Int. Cl.
G06F 17/00 (2006.01)
G06N 5/02 (2006.01)
(52) U.S. Cl. ......................... 706/48; 704/200
(58) Field of Classification Search ................. None
See application file for complete search history.

(56) References Cited

U.S. PATENT DOCUMENTS

| | | | | |
|---|---|---|---|---|
| 5,799,268 | A * | 8/1998 | Boguraev | 704/9 |
| 5,983,190 | A * | 11/1999 | Trower et al. | 704/276 |
| 6,115,686 | A * | 9/2000 | Chung et al. | 704/260 |
| 6,212,494 | B1 * | 4/2001 | Boguraev | 704/9 |
| 6,275,797 | B1 * | 8/2001 | Randic | 704/233 |
| 6,369,821 | B2 * | 4/2002 | Merrill et al. | 345/473 |
| 6,665,641 | B1 * | 12/2003 | Coorman et al. | 704/260 |
| 6,975,970 | B2 * | 12/2005 | Thorisson | 703/1 |
| 7,175,076 | B1 * | 2/2007 | Block et al. | 235/379 |
| 7,219,060 | B2 * | 5/2007 | Coorman et al. | 704/258 |
| 7,258,269 | B1 * | 8/2007 | Block et al. | 235/379 |
| 7,350,700 | B1 * | 4/2008 | Block et al. | 235/379 |
| 7,373,300 | B1 * | 5/2008 | Bangalore et al. | 704/270.1 |
| 2003/0023435 | A1 | 1/2003 | Josephson | |
| 2003/0050782 | A1 | 3/2003 | Zweig et al. | |

OTHER PUBLICATIONS

Applying a Speaker-Dependent Speech Compression Technique to Concatenative TTS Synthesizers Lee, C.-H.; Jung, S.-K.; Kang, H.-G.; Audio, Speech, and Language Processing, IEEE Transactions on vol. 15, Issue 2, Feb. 2007 pp. 632-640 Digital Object Identifier 10.1109/TASL.2006.876762.*

(Continued)

Primary Examiner—Michael B Holmes
(74) Attorney, Agent, or Firm—Akerman Senterfitt

(57) ABSTRACT

A computerized method (300) and software product (200) is provided for querying and modifying a Multi-Level Data Structure (106) stored in a Text-to-Speech (100) engine of a data processing system having a Central Processing Unit (202), a processing system memory (203), and an operating system (201), using an application program written in an interpretive programming language. The method includes the steps of initializing (302) by means of the CPU implementing a set of commands, a data processing environment for processing the application program, processing (306) the application program, where the processing includes identifying a marked command that encapsulates a DPMS program, and upon identifying a marked command, operating (318) on the MLDS using a DPMS interpreter for producing a result from the MLDS, the result available to the application program during execution of the application program.

15 Claims, 4 Drawing Sheets

OTHER PUBLICATIONS

Achieving a hands-free computer interface using voice recognition and speech synthesis [for Windows-based ATE] Evans, J.R.; Tjoland, W.A.; Allred, L.G.; Aerospace and Electronic Systems Magazine, IEEE vol. 15, Issue 1, Jan. 2000 pp. 14-16 Digital Object Identifier 10.1109/62.821658.*

Effect of Learning on Listening to Ultra-Fast Synthesized Speech Nishimoto, Takuya; Sako, Shinji; Sagayama, Shigeki; Ohshima, Kazue; Oda, Koichi; Watanabe, Takayuki; Engineering in Medicine and Biology Society, 2006. EMBS '06. 28th Annual International Conference of the IEEE Aug. 30-Sep. 3, 2006 pp. 5691-5694.*

Using Text-to-Speech Engine to Improve the Accuracy of a Speech-Enabled Interface Benahmed, Y.; Selouani, S.-A.; Hamam, H.; O'Shaughnessy, D.; Innovations in Information Technology, 2007. Innovations '07. 4th International Conference on Nov. 18-20, 2007 pp. 302-306 Digital Object Identifier 10.1109/IIT.2007.4430395.*

Effect of Learning on Listening to Ultra-Fast Synthesized Speech Nishimoto, T.; Sako, S.; Sagayama, S.; Ohshima, K.; Oda, K.; Watanabe, T.; Engineering in Medicine and Biology Society, 2006. EMBS '06. 28th Annual International Conference of the IEEE Aug. 2006 pp. 5691-5694 Digital Object Identifier 10.1109/IEMBS.2006.260473.*

AUT-Talk: A Farsi Talking Head Safabakhsh, R.; Mirzazadeh, F.; Information and Communication Technologies, 2006. ICTTA '06. $2^{nd}$ vol. 2, Apr. 24-28, 2006 pp. 2994-2998.*

Scalable Implementation Of Unit Selection Based Text-To-Speech System For Embedded Solutions Nukaga, N.; Kamoshida, R.; Nagamatsu, K.; Kitahara, Y.; Acoustics, Speech and Signal Processing, 2006. ICASSP 2006 Proceedings. 2006 IEEE International Conference on vol. 1, May 14-19, 2006 pp. I-I Digital Object Identifier 10.1109/ICASSP.2006.1660.*

Prosody and style controls in CU Vocal using SSML and SAPI XML tags Tien-Ying Fung; Yuk-Chi Li; Meng, H.; Ching, P.C.; Chinese Spoken Language Processing, 2004 International Symposium on Dec. 15-18, 2004 pp. 209-212 Digital Object Identifier 10.1109/CHINSL.2004.1409623.*

Natural language interface for mobile robot navigation control Insop Song; Guedea, F.; Karray, F.; Yanqin Dai; El Khalil, I.; Intelligent Control, 2004. Proceedings of the 2004 IEEE International Symposium on 2004 pp. 210-215 Digital Object Identifier 10.1109/ISIC.2004.1387684.*

A study on the design and evaluation of an adaptive web browser for students with reading difficulties Chi Nung Chu; Ming Chung Chen; Tien Yu Li; Computers in Education, 2002. Proceedings. International Conference on Dec. 3-6, 2002 pp. 1234-1235 vol. 2.*

Previs: a person-specific realistic virtual speaker Maldonado, J.M.; Pujol, F.A.; Sanz, I.I.; Multimedia and Expo, 2002. ICME '02. Proceedings. 2002 IEEE International Conference on vol. 1, Aug. 26-29, 2002 pp. 461-464 vol. 1 Digital Object Identifier 10.1109/ICME.2002.1035818.*

Personalized face and speech communication over the Internet Kshirsagar, S.; Joslin, C.; Won-Sook Lee; Magnenat-Thalmann, N.; Virtual Reality, 2001. Proceedings. IEEE Mar. 13-17, 2001 pp. 37-44 Digital Object Identifier 10.1109/VR.2001-913768.*

Conversational system based on evolutionary agents Moisa, T.; Dediu, A.H.; Ontanu, D.; Evolutionary Computation, 2000. Proceedings of the 2000 Congress on vol. 1, Jul. 16-19, 2000 pp. 424-430 vol. 1 Digital Object Identifier 10.1109/CEC.2000.870327.*

CORBA-based multimedia audio chat Cimpu, V.F.; Ionescu, D.; Vieru, V., Cimpu, M.; Electrical and Computer Engineering, 1999 IEEE Canadian Conference on vol. 1, May 9-12, 1999 pp. 342-345 vol. 1 Digital Object Identifier 10.1109/CCECE.1999.807221.*

Achieving a hands-free computer interface using voice recognition and speech synthesis [for ATE] Evans, J.R.; Tjoland, W.A.; Allred, L.G.; Autotestcon '99. IEEE Systems Readiness Technology Conference, 1999. IEEE Aug. 30-Sep. 2, 1999 pp. 105-107 Digital Object Identifier 10.1109/AUTEST.1999.800363.*

Automatic generation of synthesis units for trainable text-to-speech systems Hon, H.; Acero, A.; Huang, X.; Liu, J.; Plumpe, M.; Acoustics, Speech and Signal Processing, 1998. Proceedings of the 1998 IEEE International Conference on vol. 1, May 12-15, 1998 pp. 293-296 vol. 1 Digital Object Identifier 10.1109/ICASSP.1998.674425.*

Recent improvements on Microsoft's trainable text-to-speech system-Whistler Huang, X.; Acero, A.; Hon.; H.; Ju, Y.; Liu, J.; Meredith, S.; Plumpe, M.; Acoustics, Speech, and Signal Processing, 1997. ICASSP-97., 1997 IEEE International Conference on vol. 2, Apr. 21-24, 1997 pp. 959-962 vol. 2 Digital Object Identifier 10.1109/ICASSP.1997.596.*

* cited by examiner

OBJECT SPECIFIC LANGUAGE EXTENSION INTERFACE FOR A MULTI-LEVEL DATA STRUCTURE

BACKGROUND

1. Field of the Invention

The present invention relates to the field of information processing and, more particularly, to speech-based processing.

2. Description of the Related Art

Speech processing systems have become increasingly popular for interfacing with software applications, customer support systems, embedded devices, and voice interactive based electronics. Speech processing systems allow users to speak or enter text into a machine for performing a programmatic action. For example, a caller can speak into an interactive voice response system that can direct the caller to a routing destination using natural language understanding. In another example, a Text-to-Speech system can evaluate conditions within a written text to synthesize speech using a set of grammar rules which reveal how to read or interpret the text. The grammar rules can specify associations between the words describing how the text will be translated and constructed from its typographical form to acoustic form during a synthesis process.

International Business Machines Corporation (IBM) of Armonk, N.Y. provides a text-to-speech system that includes a text processing engine which uses a structure of parallel streams of information present in the speech synthesis process. This data structure of parallel streams is known as a Multilevel Data Structure (MLDS). This approach is based on a special-purpose programming language specifically designed for formulating and testing linguistic rules to operate on the text. The MLDS consists of multiple synchronized streams of coordinated units, such as phrases, words, syllables, phonemes and morphemes. For example, within the context of a text-to-speech system, the system can produce the various streams of information needed in the MLDS from the written text.

Systems involving complex data structures that require new mechanisms for accessing and manipulating them, such as the MLDS, are typically written in specialized languages that are specifically designed for handling these data structures. For example, the MLDS requires the explicit representation of relationships between all relevant (user- definable) abstract linguistic units, such as phrases, words, syllables, and phonemes, as well as quantitative phonetic values, such as formant frequencies, amplitudes, and durations. A language supporting this data structure must enable linguists or users to implement linguistic rules based on a wide range of phonological and phonetic models, which may involve testing for certain conditions in the data contained within the MLDS.

The Delta Programming Language was designed by linguists for managing the complex interactions between the phrases, words, morphemes, and phonemes created by the linguistic rules. The Delta Programming Language's specification contains a specialized pattern matching syntax called delta pattern matching syntax (DPMS) for managing a multi-level data structure. Using this language, the developer can specify pattern matching criteria called DPMS constructs for managing the MLDS. The delta programming language has its own proprietary format that can declare variables and write procedures. However, the delta language is limited and it does not support language extension components such as new data types, pointers, and arrays. Accordingly, the DPMS is limited in its ability to support sophisticated pattern matching searches and procedures within the context of an object oriented programming language such as C++. There remains a need, however, to extend a rich programming language like C++ to include the desired specialized features, such as the MLDS and its pattern matching syntax.

SUMMARY OF THE INVENTION

A computer program product is provided for use with a Multi-Level Data Structure (MLDS). In one arrangement, the computer program product comprises a computer usable medium having computer readable program code embodied in the medium for causing a Delta Pattern Matching Syntax (DPMS) program to be executed so as to manipulate the MLDS. For example, the DPMS program can be encapsulated within a marked command of the computer readable program code. The computer readable program code can include a first module for causing the data processing system to 1) initialize a data processing environment for processing the DPMS program by means of the CPU implementing a set of program language instructions, and 2) process the marked command for mapping constructs of the DPMS program to DPMS constructs in the programming language for placement in an encoded structure.

The computer readable program code can also include a second module for causing the data processing system to execute the DPMS constructs in the MLDS using a DPMS interpreter stored in the data processing system memory. For example, the DPMS constructs can represent a set of instructions specifying procedural rules of operation on the MLDS, where the DPMS interpreter can query and modify the MLDS using the DPMS constructs. Also, the DPMS interpreter can communicate with the MLDS using a delta programming language to produce a result. And, the Delta Pattern Matching Syntax (DPMS) program can be a single line command string written in the delta programming language. A plurality of marked commands can be dispersed throughout the computer readable program code.

In one arrangement, the computer readable first program code for mapping the constructs of the DPMS program can comprise a third module for causing the data processing system to parse the constructs of the DPMS program, convert the constructs of the DPMS program into executable runtime instructions, and place the executable runtime instructions in an encoded data structure within the computer readable program code in a format recognizable by the programming language. The parsing, converting, and placing can also occur during a run-time execution of the program code to communicate with the MLDS to receive the result during run-time processing of the program code.

In another arrangement, the computer readable first program code can comprise a first computer readable program code for causing the data processing system to designate areas of the data processing system memory as shared memory for work area storage during the processing of the DPMS program, and a second computer readable program code for causing the data processing system to designate data processing system variables for use during the processing of the DPMS program as shared variables. For example, the first and second computer readable program code can communicate data with the MLDS through assignment and access of the shared memory and the shared variables.

For example, the computer readable program code can be a C++ source code program and the encoded data structure can be a class object in the C++ programming language. Accordingly, the encoded data structure can have its own syntax and set of methods and language extensions for manipulating DPMS constructs of the encoded data structure within a C++ data processing environment.

In one arrangement, the second module for causing the data processing system to execute the DPMS constructs in the MLDS further can comprise computer readable program code for causing the DPMS interpreter to control a scope of the DPMS query within the MLDS using a "fence". For example, the computer readable program code can cause the DPMS interpreter to restrict access to MLDS data within the fence boundaries, where the fence is specified by the computer programming language to restrict pattern matching within the MLDS to limit its response.

In another form, a computerized method is provided for creating a marked command in a computer application program, the marked command for querying and modifying a Multi-Level Data Structure (MLDS). The method can include the steps of scanning the computer application program for DPMS program statements, and encapsulating DPMS program statements under a descriptive header at a location in the DPMS program. For example, the DPMS program can include DPMS constructs that can represent a set of instructions specifying procedural rules of operation on the MLDS.

In another form of the invention, a computerized program product is provided for use with a Multi-Level Data Structure (MLDS) and data processing system memory. The computerized program product can include a computer usable medium having computer readable program code embodied in the medium for interfacing between a data processing environment for executing a C++ program with a data processing environment for a MLDS. In one arrangement, the computer readable program code can include a first module for causing a computer to designate areas of the data processing system memory for work area storage during the processing of the C++ program, and initializing data processing system variables used during the processing of the C++ program.

A computerized method is provided for querying and modifying a Multi-Level Data Structure (MLDS). The method can include the steps of initializing by the CPU implementing a set of commands, a data processing environment for processing the application program, where the processing includes identifying a marked command that encapsulates a DPMS program, and upon identifying a marked command, operating on the MLDS using a DPMS interpreter for producing a result from the MLDS. For example, the DPMS program can be a single line command string containing a DPMS construct written in the delta programming language. Also, the marked command can be dispersed throughout the application program.

In one arrangement, the DPMS interpreter can operate on the MLDS for communicating with the MLDS by executing a DPMS construct in the MLDS. The DPMS construct can be an instruction specifying procedural rules of operation on the MLDS. The DPMS interpreter can query and modify the MLDS using the DPMS construct to produce a result from the MLDS. For example, the result from the MLDS can be made available to the application program during execution of the application program. For instance, the result returned can be a set of acoustic parameter values used with a synthesizer to produce speech.

The initializing the data processing environment can include designating areas of the data processing system memory as shared memory for work area storage during the processing of the application program, and initializing data processing system variables for use during the processing of the application program as shared variables. In one arrangement the processing the application program can include parsing constructs of the DPMS program and converting them into executable runtime instructions that are placed in an encoded data structure. In another arrangement, the executing the DPMS construct can include using a fence to control a scope for querying and modifying the MLDS. For example, the fence can control access of the DPMS interpreter to the encoded data structure, and thereby restrict pattern matching within the MLDS to limit the result.

The encoded data structure can be placed within the computer readable program code in a format recognizable by the application programming language. In one arrangement, the steps of parsing constructs and converting them can occur during a run-time execution of the application program. For example, the DPMS interpreter can communicate with the MLDS during run-time execution for receiving a result during run-time processing of the application program.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a computer program product for use with a Multi-Level Data Structure (MLDS). The computer program product can include a computer usable medium having computer readable program code embodied in the medium for causing a Delta Pattern Matching Syntax (DPMS) program to be executed to perform operations on the MLDS, where the DPMS program can be encapsulated within a marked command of the computer readable program code. For example, the computer readable program code can include a first module for causing the data processing system to 1) initialize a data processing environment for processing the DPMS program by means of the CPU implementing a set of program language instructions, and 2) process the marked command for mapping constructs of the DPMS program to DPMS constructs in the programming language for placement in an encoded structure. The computer readable program code can execute the DPMS constructs using a DPMS interpreter stored in the data processing system memory. For example, the DPMS constructs can represent a set of instructions specifying procedural rules of operation on the MLDS, wherein the DPMS interpreter can query and modify the MLDS using the DPMS constructs, wherein the DPMS interpreter performs operations on the MLDS, and wherein a result is ultimately produced in the MLDS.

The operative aspects of the embodiments of the invention are further described herein primarily in the context of performing text-to-speech synthesis. It will be apparent to one of ordinary skill, however, that the invention applies equally well in other contexts, such as natural language understanding (NLU), voice recognition (VR), and interactive voice response (IVR) systems.

Figure 1:
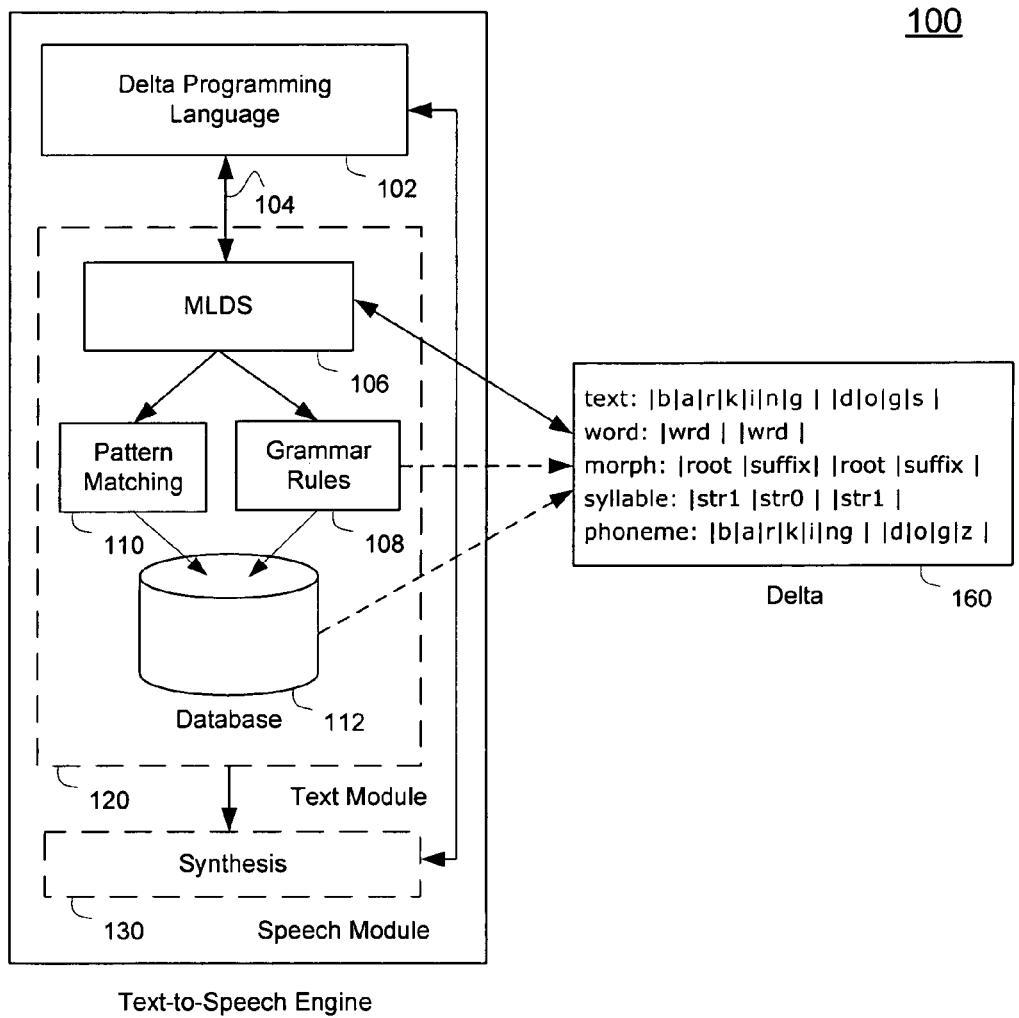
FIG. 1 is a schematic depiction of a text engine.

Referring to FIG. 1, a text engine 100 is shown. The text engine can include a text module 120 and a speech module 130. The text module 120 can include a phoneme Database 112, logic to analyze text performing operations on the MLDS, which included a set of linguistic rules 110, and a multi-level data structure (MLDS) 106. The Database is not limited to being a phoneme database. The text module can analyze text using linguistic rules 110 with the phoneme database 112 to produce the various parallel information streams in the MLDS. For example, the phrase "barking dogs" can be input to the TTS engine to generate the MLDS 160. For example, the MLDS 160 can contain various streams such as word, syllable, morpheme, and phoneme, with each stream containing units representing relevant linguistic properties. The linguistic properties can be associations between units within a stream and across streams. For instance, the association can describe the intonation across each unit. In another example, a word unit can contain information about its grammatical category, a syllable unit can contain information about degree of stress or accent, and each phoneme can contain information about its place and manner of articulation.

The MLDS 106 can capture relationships between the word units of the parallel information streams. Accordingly, the MLDS 106 can provide important linguistic information for applying rules of speech production to speech synthesis. For example, the synthesis module 130 can utilize the linguistic information contained in the MLDS 106 for the MLDS 160 to derive acoustic parameters describing how speech production algorithms can synthesize speech. The speech module 130 can use the linguistic information produced by the text module 120 to determine perceptually relevant synthesizer parameters for synthesizing speech.

Algorithms 102 written in a standard programming language such as C++ with embedded DPMS statements can be used to manipulate the MLDS 106 to access and manage the MLDS. The algorithms 102 can contain DPMS constructs that can specify pattern matching statements to test for conditions within the MLDS. 106. The MLDS 106 can communicate with the DPMS constructs contained within the delta program 102 to evaluate the connectivity associations between word elements, phrases, and word sub-units as described. The MLDS 160 can be a specialized data structure upon which Delta Pattern Matching Syntax (DPMS) constructs can be used to evaluate these conditions. To note, DPMS constructs are pattern matching statements written in the DPMS syntax for testing and modifying the contents of the MLDS. The MLDS 106 can analyze input text to reveal relationships identified by the TTS 100 between all relevant (user-definable) phonological units (e.g., phrases, words, syllables, phonemes) and quantitative phonetic values of the text. The MLDS 106 can provide flexible rule formalism through the DPMS constructs for manipulating this structure.

Figure 2:
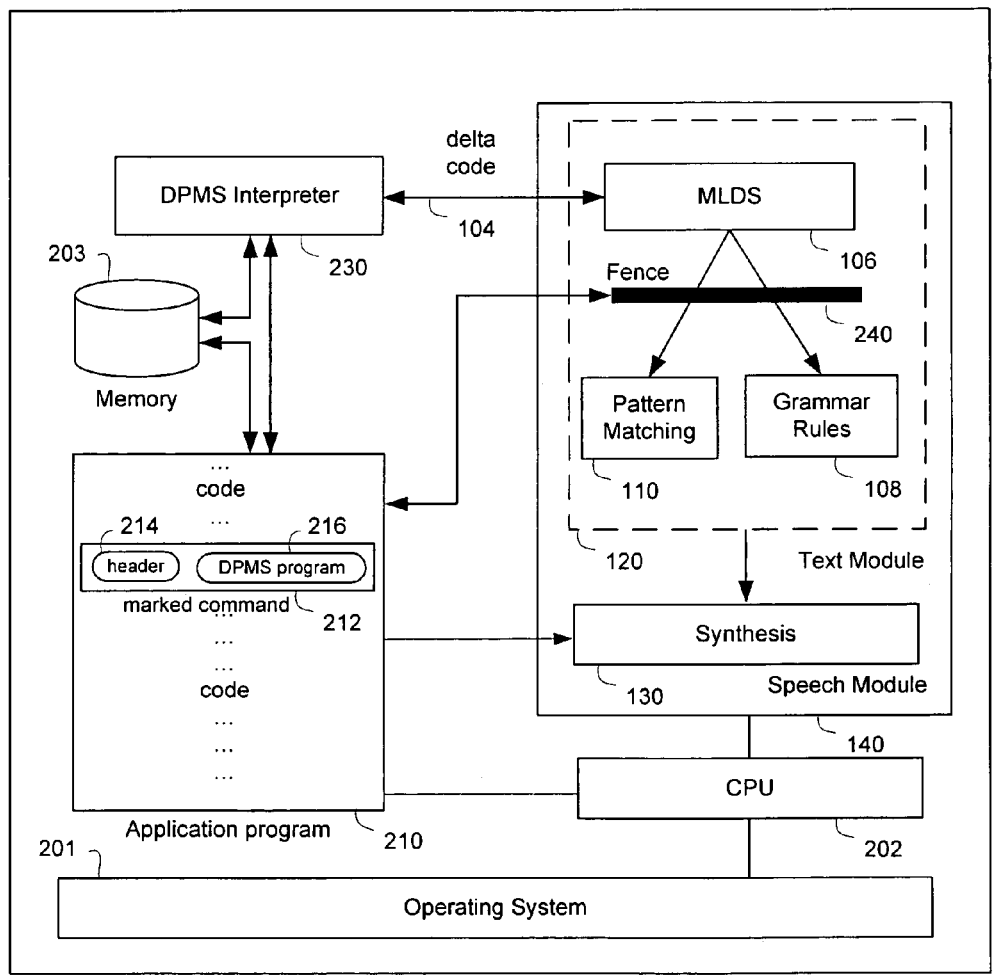
FIG. 2 is a schematic illustrating an object specific language interface in accordance with the inventive arrangements disclosed herein.

Referring to FIG. 2, a computer program product for use with a Multi-Level Data Structure (MLDS) stored in a Text-to-Speech (TTS) engine of data processing system 200 is shown. The data processing system 200 can include an operating system 201, a Central Processing Unit (CPU) 202, and a memory 203. The computer program product can include an application program 210, the memory 203, a DPMS interface 230, and a TTS engine 100. The application program can communicate with the MLDS 106 of the TTS engine 100 through the DPMS interface 230. The DPMS interpreter 230 can communicate with the MLDS 106. An application program 210 can test and modify the MLDS 106 with the functionality available to the programming language of the application program 210. For example, the application program 210 can be written in C++ and can contain object oriented classes that can communicate with the MLDS using DPMS constructs embedded within the class through the class methods.

DPMS constructs 216 can be written embedded in a standard within a marked programming language and can be encapsulated as a DPMS statement within a marked command 212. The marked command 212 is contained as a literal string within a macro to distinguish it from native entries in the programming language of the application program 210. The header 214 can identify the segment of code as a marked command 212 that can be interpreted by a DPMS interpreter 230 during a compilation of the application program 210. For example, the DPMS interpreter 230 can identify marked commands by their respective header 214, parse the DPMS constructs within the DPMS program 216, and execute them using an encoded data structure that specifies the operations and operands that are involved in the DPMS statement. Different headers can signify different processing tasks. For example, one header can specify a modification operation in the MLDS such as changing a phoneme type. Whereas, a different header can specify a test operation within the MLDS, such as checking for suffixes or prefixes. The application program 210 can interact with the DPMS interface 230 through a shared memory 203. Also, the application program 210 can declare and initialize variables during the compiling of the application program 210 based on the DPMS program 216 contained within the marked commands 212. The application program 210 can share data and variables with the DPMS during run-time execution of the application program 210.

The DPMS interpreter 230 can communicate with the MLDS 106 using MLDS class member functions 104. The computer program product can also include a fence 240 that limits the extent of a pattern matching search by the MLDS 106. The MLDS is a multi-tiered utterance representation consisting of an array of parallel data streams. The application program 210 can include control code to further restrict the depth of pattern matching and to further limit the extent of the DPMS linguistic rules. The application program 210 can, for example, set a fence 240 to isolate the matching of a DPMS rules to certain word unit connections or phrases within the MLDS.

Figure 3:
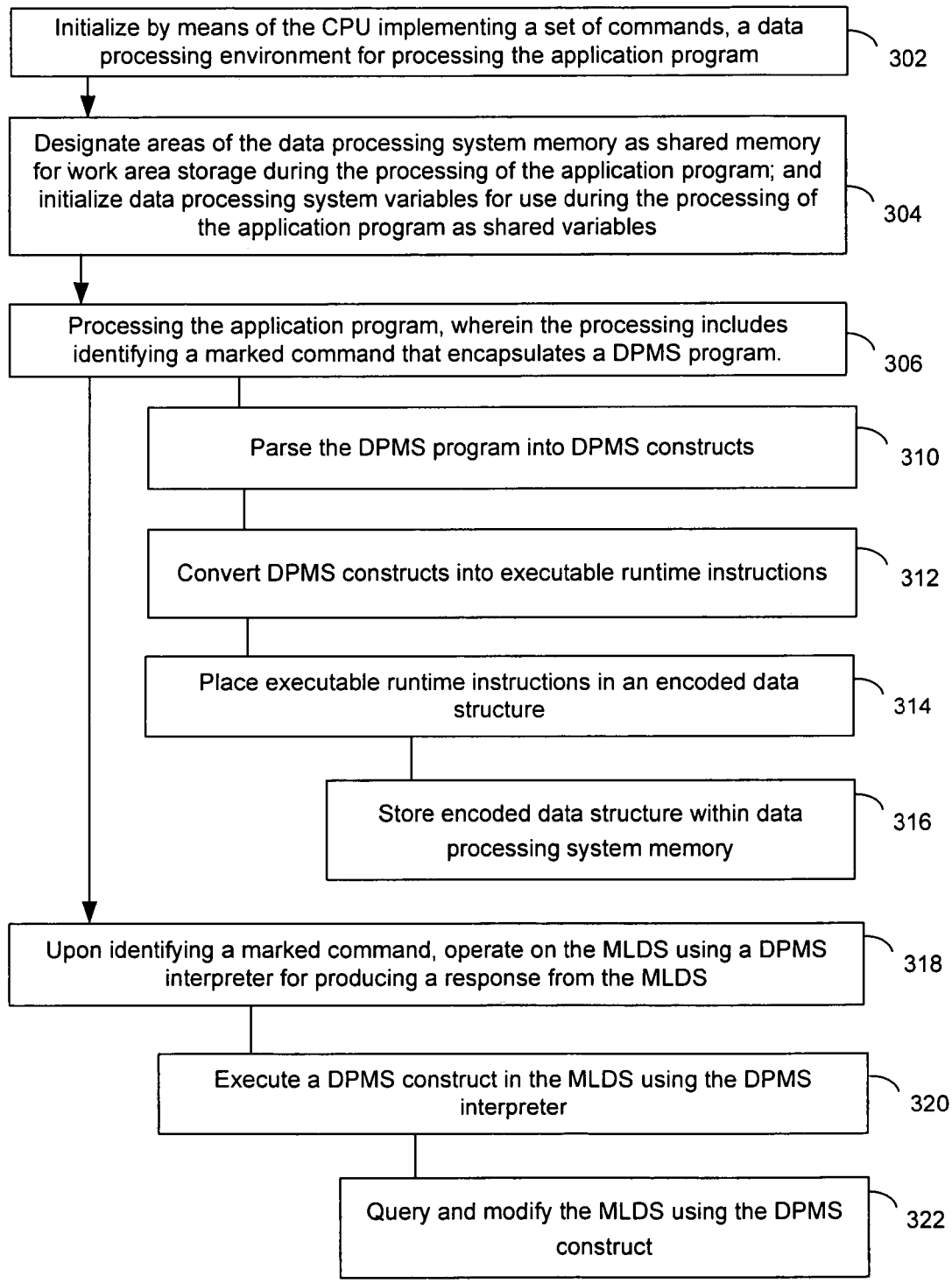
FIG. 3 is a flowchart illustrating a method for querying and modifying a Multi-Level Data Structure (MLDS) with the inventive arrangements disclosed herein.

Referring to FIG. 3, a method 300 for querying and modifying a Multi-Level Data Structure (MLDS) stored in a Text-to-Speech (TTS) engine is shown. Reference will also be made to FIG. 2 for describing the actions of the structural program code elements responsible for causing the method steps. At step 302, a data processing environment for processing a DPMS program encapsulated within a marked command of an application program can be initialized. At step 304, areas of the data processing system memory can be designated as shared memory for work area storage during the processing of the DPMS program. Data processing system variables for use during the processing of the DPMS program can be designated as shared variables. Referring to FIG. 2, the operating system 201 designates shared memory and shared variables for the DPMS constructs 216 within the computer storage memory 203 during compilation of the application program 210.

At step 306 the application program can be processed which can include identifying a marked command. At step 310, constructs of the DPMS program can be parsed. At step 312, the DPMS constructs can be converted into executable runtime instructions. At step 314, the executable runtime instructions can be placed in an encoded data structure. And at step 316, the encoded data structure can be placed within computer readable program code in a format recognizable by the programming language. The encoded data structure can be placed in program code in addition to being placed in memory.

For example, referring to FIG. 2, The DPMS interpreter 230 identifies a marked command 212 and parses DPMS constructs from the DPMS program 216. The DPMS interpreter 230 converts the DPMS constructs to executable runtime instructions during compilation of the application programming language. The DPMS interpreter then places the executable runtime instructions in an encoded data structure within the memory 203. The DPMS interpreter 230 sets aside the DPMS constructs from the DPMS program 216 into shared memory 203 as an encoded data structure.

Upon identifying a marked command, the method 300 at step 318 can operate on the MLDS using the DPMS interpreter to evaluate a condition or set of conditions in the MLDS. The response can be made available to the application program during execution of the application program. At step 320, the DPMS constructs can be executed in the MLDS using a DPMS interpreter stored in the data processing system memory. For example, referring to FIG. 2, the DPMS interpreter 230 communicates with the MLDS 106 using the parsed DPMS constructs from the DPMS program. For example, the DPMS constructs are contained within the encoded data structure and represent a set of instructions specifying procedural rules of operation on the MLDS 106. Accordingly, at step 322, the DPMS interpreter can be used to query and modify the MLDS using the DPMS constructs contained within the encoded data structure. Referring to FIG. 2, during the program 210 execution, the DPMS interpreter 230 queries and modifies the MLDS by accessing the encoded data structure using program language components of the application program 210.

Additionally, a scope of the DPMS query can be controlled within the MLDS using a fence. The fence is integrated within the application program to restrict pattern matching within the MLDS. For example, the application program 210 places the fence 240 between the MLDS 106 and the set of pattern matching rules 110 and grammar rules 108. The application program 210 controls the extent of the fence 240 which limits the range of information in the MLDS that can be evaluated while evaluating conditions and matching patterns in the MLDS.

Figure 4:
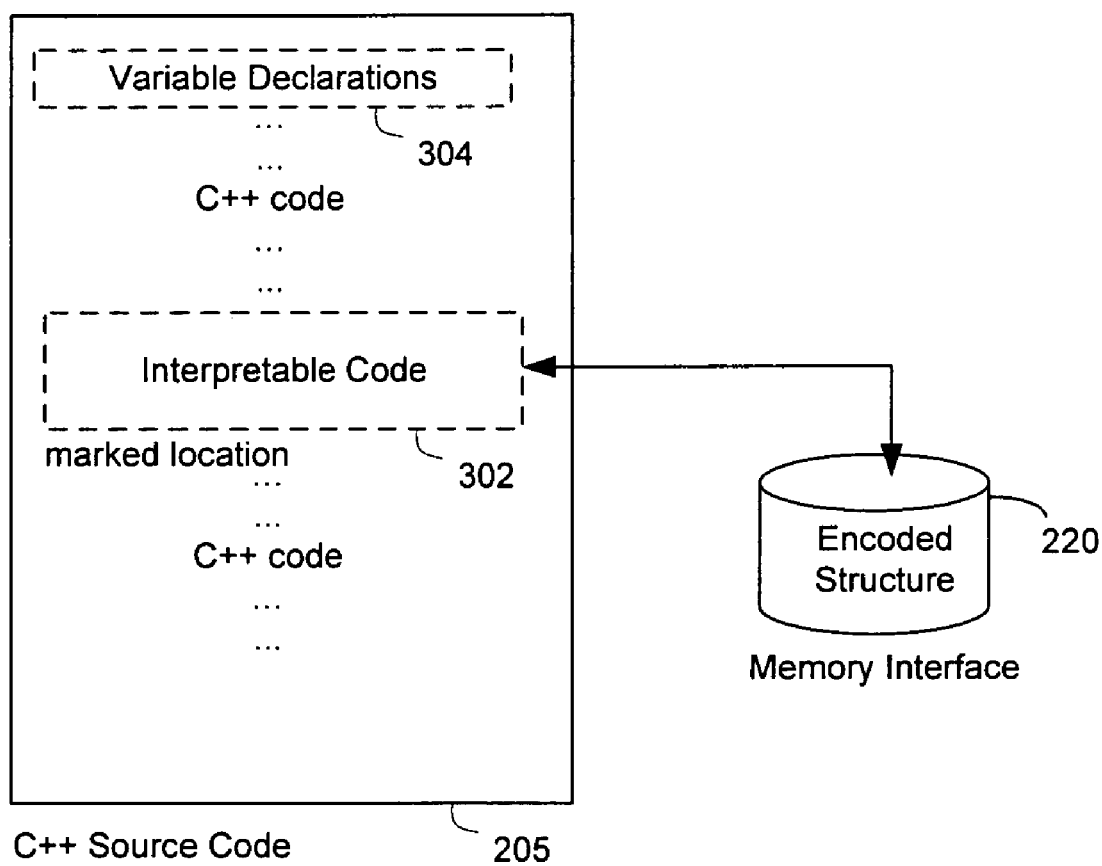
FIG. 4 is an illustration depicting a portion of compiled source code for use with object specific language interface in accordance with the inventive arrangements disclosed herein.

Referring to FIG. 4, a diagram of a portion of a compiled program code is shown. The application program will be discussed with reference to FIG. 2. The application program can be written as a C++ program within the data processing environment 200 for accessing the MLDS 106 . The C++ developer includes marked commands 212 to designate query and search requests within the MLDS during C++ program execution. The C++ developer compiles the application program, and during the compilation, the DPMS interpreter 106 identifies the marked commands 212. The build-time parser maps constructs of the DPMS program 216 encapsulated within the marked command 212 to C++ constructs within an encoded data structure. The encoded data structure is a C++ class object that has its own syntax and set of methods and language extensions for evaluating the MLDS contents. The C++ constructs are the structure fields that identify the DPMS constructs. To note, the DPMS program 216 can be a single line command string written in the delta programming language and marked commands can be dispersed throughout the C++ program.

It should be noted, that the application developer writes the application program code 210 and creates the DPMS program content for the marked command 212. For example, a developer can decide how they want the MLDS 106 to search for a phoneme type in a generated delta. The developer creates a marked command 212 that includes a DPMS program 216 containing DPMS constructs specifying search criteria for the phoneme type. For example, the developer compiles the application program and during compilation the DPMS interpreter 230 identifies the marked commands 212. The DPMS interpreter communicates with the MLDS during a run-time execution to query a response during run-time processing of the application program. For example, each marked command 212 will query the MLDS as a distinct process made during the program execution.

Referring back to FIG. 4., the DPMS interpreter 230 will preserve the locations of the marked command locations but include reference to either an encoded data structure 220 stored in memory, or a section of inserted C++ code containing executable program instructions. The interpretable code 302 can be one of an encoded data structure or a section of C++ code. Recall, the DPMS interpreter 230 parses the C++ application program searching for marked commands. Upon finding marked commands, the DPMS interpreter 230 can declare and initialize variables 304 within the C++ source code 210 having local or global scope for the DPMS program contained within the marked commands 212. Accordingly, the C++ program designates areas of the data processing system memory for work area storage during the processing of the C++ program, and initializes data processing system variables used during the processing of the C++ program. The interpretable code 302 can have its own local scope in relation to the global scope of the C++ application program 210. Local scope means that variables retain their values only within the interpretable code 302. Global scope means variables can retain their values throughout program execution. The interpretable code may also access variables passed to a function scope as parameters, or to class member variables. The proper scoping of variables by name is accomplished with a VarList object that correlates the names of variables with their addresses in the intended scope. The marked commands signify to the DPMS interpreter 230, to issue query requests to the MLDS at the time the marked commands are processed during program execution.

The DPMS constructs are encoded into data structures representing operators and operands within a C++ class object stored in the data processing system memory. The DPMS interpreter 106 interprets these data structures at runtime to effect the execution of the DPMS pattern matching operations on the MLDS 106. The DPMS interpreter 106 passes DPMS constructs contained within the class object to the MLDS to evaluate conditions in the MLDS and produce a result. The C++ application program 210 can execute the marked command 212 using the DPMS interpreter 106 to query information in the MLDS using a C++ class object. The DPMS interpreter 106 can place the result in data processing system memory which becomes accessible to the C++ program through a C++ class object. The DPMS interpreter 230 can process all these actions at the time it identifies a marked command 212. In effect, the program execution waits for the DPMS interpreter to process a result before continuing forward. Accordingly, the compiler works together with the DPMS interpreter 230 during compilation to establish the priority and timing of code execution.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A data processing system comprising computer hardware having one or more processors for generating speech from text, and further comprising: a Text-to-Speech (TTS) engine having stored therein a Multi-Level Data Structure (MLDS); a Delta Pattern Matching Syntax (DPMS) program to be executed for evaluating conditions in said MLDS, the DPMS program being encapsulated within a marked command of an application program, the DPMS program being parsed into DPMS constructs representing a set of instructions specifying procedural rules of operation on the MLDS; and a DPMS interface through which the application program communicates with the MLDS of the TTS engine; wherein the DPMS interface includes an DPMS interpreter that can query and modify the MLDS using the DPMS constructs.

2. The data processing system of claim 1, wherein the DPMS constructs are converted into executable runtime instructions and placed in an encoded data structure stored within a memory of the data processing system.

3. The data processing system of claim 1, wherein the data processing system designates areas of the memory as shared memory for work area storage during the processing of the DPMS program and designates data processing system variables for use during the processing of the DPMS program as shared variables.

4. The data processing system of claim 1, wherein said DPMS program is a single line command string written in the delta programming language, and wherein a plurality of marked commands is dispersed throughout the application program.

5. The data processing system of claim 2, wherein said application program is a C++ source code program, and wherein said encoded data structure is a class object in the C++ programming language, wherein the encoded data structure has its own syntax and set of methods and language extensions for manipulating the DPMS constructs of said encoded data structure within a C++ data processing environment.

6. The data processing system of claim 1, wherein the DPMS interpreter controls a scope of said DPMS query within the MLDS using a fence, wherein the DPMS interpreter accesses said encoded data structure through use of said fence, wherein said fence is integrated within said application program to restrict an extent of a pattern matching search by the MLDS.

7. The data processing system of claim 2, wherein the DPMS program is parsed and converted during a run-time execution of said application program, wherein said run-time execution allows said DPMS interpreter to communicate with the MLDS to evaluate conditions in the MLDS during run-time processing of said application program, and to produce a result of that evaluation.

8. A computer-implemented method of processing electronic data, the method comprising the steps of: providing a data processing system including a Text-to-Speech (TTS) engine, having stored therein a Multi-Level Data Structure (MLDS), a Delta Pattern Matching Syntax (DPMS) program to be executed for evaluating conditions in the MLDS, and a DPMS interface for communicating with the MLDS of the TTS engine; creating a marked command in an application program for querying and modifying the MLDS, including the steps of: scanning the application program for a DPMS program including DPMS constructs that represent a set of instructions specifying procedural rules of operation on the MLDS; and encapsulating the DPMS program under a descriptive header at a location of the DPMS program; initializing a data processing environment for processing the application program; processing the application program, wherein the processing includes identifying the marked command that encapsulates the DPMS program; and upon identifying the marked command, operating on the MLDS using the DPMS interpreter for producing a result from the MLDS, the result being available to the application program during execution of the application program.

9. The method of claim 8, wherein initializing the data processing environment further comprises designating areas of the data processing system memory as shared memory for work area storage during the processing of the application program; and initializing data processing system variables for use during the processing of the application program as shared variables.

10. The method of claim 8, wherein the processing the application program further comprises the steps of:
   parsing the DPMS program into DPMS constructs, converting said DPMS constructs into executable runtime instructions, and placing said executable runtime instructions in an encoded data structure; and
   wherein the encoded data structure is embedded within said application program by storing said encoded data structure within a data processing system memory, and said encoded data structure is in a format recognizable by an interpretive programming language.

11. The method of claim 8, wherein the operating on the MLDS using the DPMS interpreter further comprises executing a DPMS construct in the MLDS using the DPMS interpreter, wherein the DPMS construct represents an instruction specifying procedural rules of operation on the MLDS, wherein the DPMS interpreter can query and modify the MLDS using the DPMS construct, wherein the DPMS interpreter communicates with the MLDS using a delta programming language.

12. The method of claim 11, wherein the executing a DPMS construct further comprises using a fence to control a scope for querying and modifying the MLDS, wherein the fence controls access of the DPMS interpreter to said encoded data structure, wherein said fence restricts pattern matching within the MLDS to limit said result.

13. The method of claim 8, wherein said DPMS program is a single line command string written in the delta programming language, and wherein a plurality of marked commands is dispersed throughout said application program.

14. The method of claim 10, wherein said embedding occurs during a run-time execution of said application program for the DPMS interpreter to communicate with the MLDS to receive said result during run-time processing of said application program.

15. The method of claim 8, wherein said result from the MLDS can be a set of acoustic parameter values for use with a synthesizer to produce speech.

* * * * *